(No Model.)

H. T. WINDT.
VERMIN TRAP.

No. 293,609. Patented Feb. 12, 1884.

Witnesses.  
Lewis Tomlinson  
J. B. Fetherstonhaugh

Inventor.  
Henry T. Windt  
by Donald C. Ridout & Co.  
Attorneys

UNITED STATES PATENT OFFICE.

HENRY THEODORE WINDT, OF TORONTO, ONTARIO, CANADA.

VERMIN-TRAP.

SPECIFICATION forming part of Letters Patent No. 293,609, dated February 12, 1884.

Application filed September 14, 1883. (No model.)

*To all whom it may concern:*

Be it known that I, HENRY THEODORE WINDT, of the city of Toronto, in the county of York, in the Province of Ontario, Canada, manufacturer, have invented certain new and useful Improvements in Vermin-Traps; and I do hereby declare that the following is a full, clear, and exact description of the same.

The object of the invention is to produce a simple mouse or rat trap so arranged that each rat or mouse caught resets the trap; and it consists in the peculiar construction, arrangement, and combinations of parts, as hereinafter more fully described and claimed.

Figure 1:
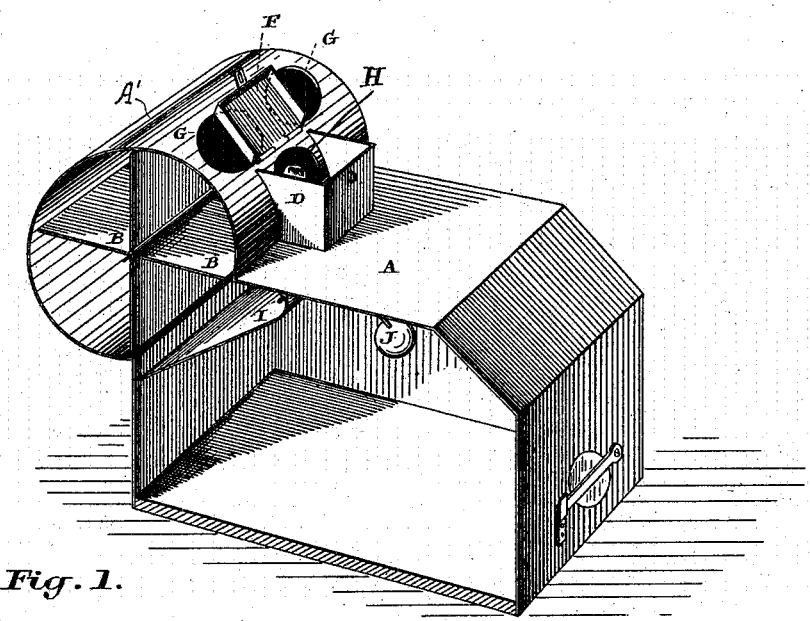
Figure 2:
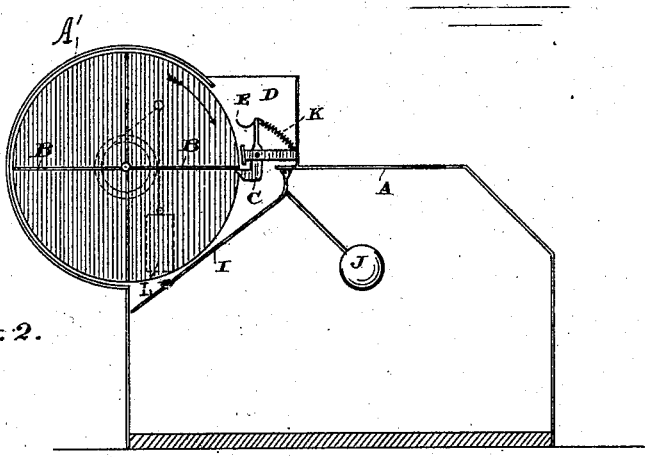

In the drawings, Figure 1 is a perspective view of my improved trap, having one side removed in order to show the interior arrangements. Fig. 2 is a longitudinal section.

A is the casing, shaped substantially as shown, and having pivoted within the cylindrical portion A' of it, as indicated, the winged platform B.

C is the hooked support, pivoted within the bait-box D. The hooked end of this support C projects, as will be noticed, below one wing of the platform B, which is in this way supported.

E is a bait-hook formed on the top end of the support C.

F is a cover to close the bait-box D, and G G are openings through which the vermin enter. An opening, H, leading into the bait-box D, allows the vermin which may enter through one of the openings G, and while standing on the platform B, to seize the bait hung on the bait-hook E. As the bait-hook E is above the pivot-point of the hooked support C, the vermin, on drawing upon this hook, withdraws the support from under the platform on which the vermin is at the time standing, and, as this platform is pivoted, it will revolve by the weight of the vermin, which in its fright will jump upon the hinged platform I, and from it into the lower portion of the casing A. As the hinged platform I is provided with a weight, J, it will immediately reassume the position it is shown in in the drawings, and will be ready for the next rat or mouse. The second wing of the platform B will also be brought into a horizontal position, and as the spring K has in the meanwhile brought back the hooked support C into the position it is shown in in the drawings, the platform B will also be ready for the next vermin which may enter the trap.

L is a weight connected by a cord to a pulley attached to the journal of the winged platform B. This weight helps to carry the winged platform around in the direction indicated by arrow, and insures the bringing of the platform around into the horizontal position indicated. Instead of this weight attached by a cord, as shown, the same effect might be produced by a spring; or the outer ends of the winged platform B might be weighted, which would probably answer the purpose equally as well as the weight and cord shown.

From this description and upon examination of the drawings attached it will be understood that the trap will catch a number of rats or mice without any attention. It will also be understood that the casing A may be made bottomless and be placed over a pot, so that the vermin caught will be dropped into the water and drowned.

The hinged platform I is intended to prevent the vermin which may be in the lower compartment of the casing A from interfering with the working of the pivoted winged platform, the said hinged platform I forming a gate which completely cuts off the vermin within the lower compartment from the point at which they enter.

I am aware of Patents Nos. 99,293, 123,381, and 136,995, and make no claim to the constructions shown therein.

What I claim as my invention is—

1. The combination of the casing A, provided with the winged platform B, revolving in the cylindrical part A' of said casing, which part is provided with openings G, the bait-box D, having a hinged cover, F, and an opening, H, communicating with said cylindrical part A', and the pivoted hook C, whose lower end receives and supports the wings of the platform, and whose upper end carries a bait-hook, E, all constructed and arranged substantially as shown and described.

2. A casing, A, having a winged platform, B, within it, and an opening leading into one of the wings of the said platform, in combination with a pivoted support having a supporting-hook at its lower end and the bait-hook at its upper end, and the hinged platform I, provided with weight J, all constructed and arranged substantially as described.

Toronto, August 28, 1883.

H. T. WINDT.

In presence of—
CHAS. C. BALDWIN,
F. B. FETHERSTONHAUGH.